L. S. CHICHESTER.
PREPARING CEREALS FOR FOOD.
No. 173,211. Patented Feb. 8, 1876.
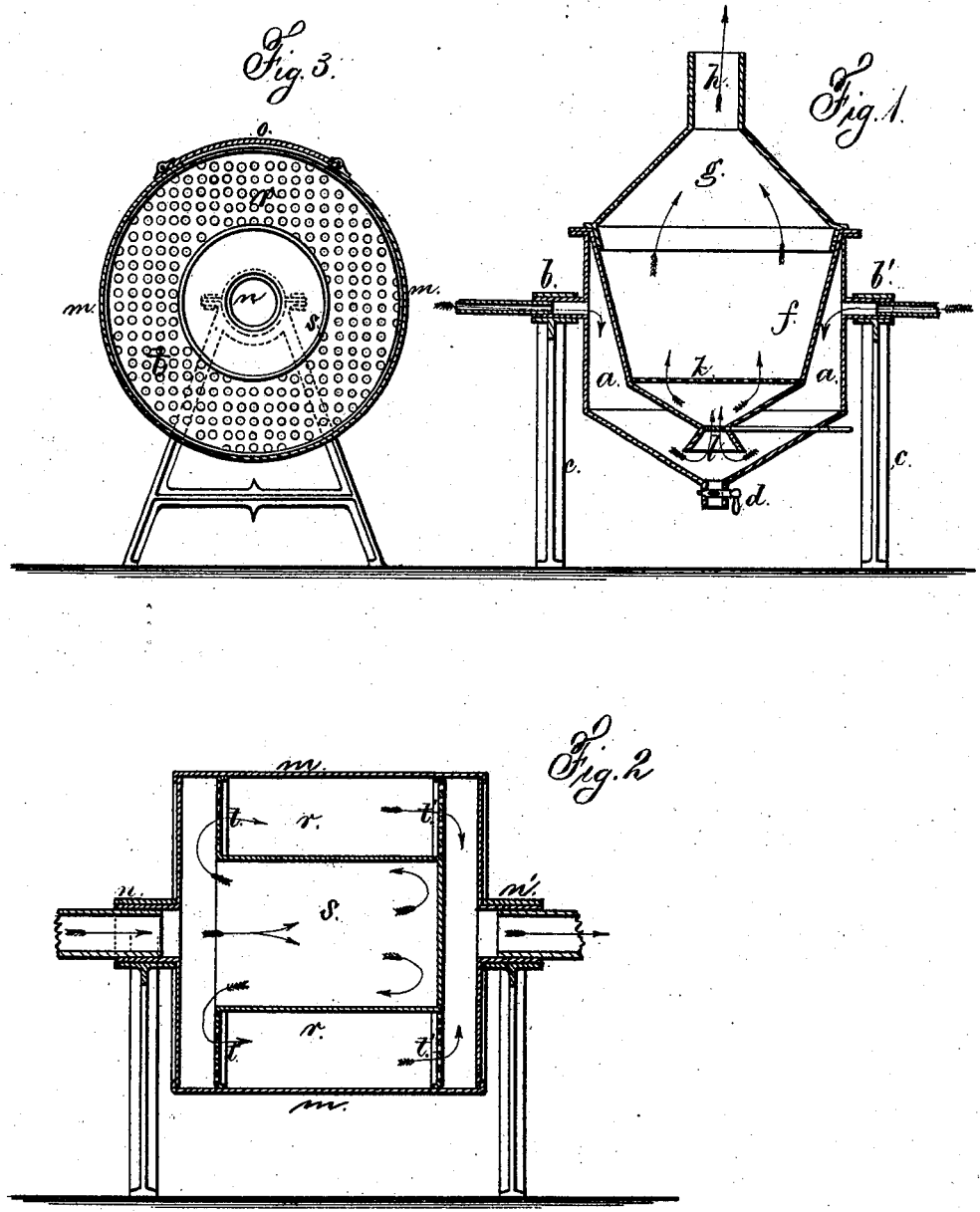

UNITED STATES PATENT OFFICE.

LEWIS S. CHICHESTER, OF NEW YORK, ASSIGNOR TO JOHN J. TYLER, OF BROOKLYN, N. Y.

IMPROVEMENT IN PREPARING CEREALS FOR FOOD.

Specification forming part of Letters Patent No. 173,211, dated February 8, 1876; application filed November 12, 1875.

*To all whom it may concern:*

Be it known that I, LEWIS S. CHICHESTER, of the city and State of New York, have invented an Improvement in Preparing Cereals for Food, of which the following is a specification:

The present invention is a modification of, and improvement upon, the methods set forth in my Patent No. 153,240, and relates to a means for, and method of, preparing cereals for food. In the said patent the cereals, in a ground state, are submitted to agitation while subjected to the action of steam.

With some kinds of grain I find it preferable to cook the ground or crushed grain in a quiescent condition, and then dry the same by heat in a separate vessel while agitated, in order that the aqueous matters may be more thoroughly removed after the cereal is in an otherwise completely-prepared condition.

In the drawing, Figure 1 is a vertical section of the apparatus for cooking the cereal. Fig. 2 is a longitudinal, and Fig. 3 a transverse section, of the apparatus for drying and cooling the cooked material.

The vessel $a$ is made with trunnions $b\ b'$, one or both of which are hollow, and receive steam-pipes and couplings. These trunnions are supported by a suitable frame, $c$, and there is a discharge-pipe, $d$, and valve for the delivery of the water of condensation. The inner vessel $f$ is connected at its edges to the vessel $a$, and there is a cover, $g$, with a pipe, $h$, that is preferably connected to an exhaust-blower, whereby vapors from the vessel $f$ will be drawn off, and there is a perforated platform, $k$, in this vessel $f$, and an opening and valve, $l$, to the conical bottom of said vessel $f$.

I proceed to prepare the wheat or other cereals, or mixture of different cereals, by grinding or cracking the same into pieces of the desired fineness, and these are placed in the vessel $f$, and steam is admitted by the valve $l$, and passes up through the perforated bottom $k$, and through the cereals, and the moisture of the steam and the heat cook the same sufficiently to adapt the mass to the subsequent operations. When the mass has been subjected to the direct action of the steam passing through the same for the required period the valve $l$ is closed, and the heat continued by the steam acting around the vessel $f$, and within the jacket or vessel $a$, and when the cooking operation is completed the cover $g$ is removed, and the mass turned out into a suitable vessel, by partially revolving the apparatus upon the trunnions $b\ b'$.

The object in shutting off the steam from passing continuously through the cereal is to retain the natural flavor of the grain, for I have discovered that the steam in passing continuously through some cereals removes the flavor and injures the properties thereof in this respect.

The drying apparatus shown in Figs. 2 and 3 consists of a cylinder, $m$, upon hollow trunnions $n\ n'$ in a frame, and there is a flap, $o$, at one side, and a grain-space, $r$, between the inner drum $s$ and the two perforated heads $t\ t'$.

The apparatus is revolved after the cooked cereals have been introduced, and warm or hot air is admitted or forced in at $n$, and exhausted or allowed to escape by the trunnion $n'$. The air passes into and heats the drum $s$, and returns through the perforated head $t$; thence through the grain, and out through the perforated head $t'$, and escapes by $n'$. In its passage the moisture of the agitated cereals is removed, and after the same is dry the mass may be cooled by the admission of atmosphere at ordinary temperature, and then the flap $o$ is opened and the cereals removed, after which it may be put up in suitable packages for sale.

The cereals thus prepared are so thoroughly cooked that they may be used for food by soaking in water or boiling for a very short time; but usually they will be prepared in the form of gruel or mush by simply stirring the same into boiling water.

I claim as my invention—

1. The vessel $f$, having a perforated platform, $k$, and steam-inlet valve $l$, in combination with the surrounding vessel $a$, forming a steam-jacket, and the supporting-trunnions $b\ b'$, as and for the purposes set forth.

2. The drying-vessel composed of the cylinder $m$, sustained upon hollow trunnions, and provided with a flap, in combination with the interior drum $s$ and perforated heads $t\ t'$, as and for the purposes set forth.

3. The method herein described of preparing cereals by first passing steam through the mass while in a quiescent condition; second, cooking the same by a continuance of the steam heat after the steam has been cut off from the mass itself; third, removing the mass from the cooking-vessel, and drying the same by heated air while the mass is being agitated, as set forth.

Signed by me this 9th day of November, A. D. 1875.

LEWIS S. CHICHESTER.

Witnesses:
 GEO. T. PINCKNEY,
 CHAS. H. SMITH.